(12) United States Patent
Tan et al.

(10) Patent No.: US 12,214,774 B2
(45) Date of Patent: Feb. 4, 2025

(54) CONTROL DEVICE FOR VEHICLE

(71) Applicant: TOYOTA JIDOSHA KABUSHIKI KAISHA, Toyota (JP)

(72) Inventors: Guodong Tan, Toyota (JP); Takao Oki, Toyota (JP); Yoshio Hasegawa, Chiryu (JP); Masashi Ikemura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 295 days.

(21) Appl. No.: 18/075,906

(22) Filed: Dec. 6, 2022

(65) Prior Publication Data

US 2023/0271601 A1 Aug. 31, 2023

(30) Foreign Application Priority Data

Feb. 25, 2022 (JP) ................................ 2022-028146

(51) Int. Cl.
*B60W 20/40* (2016.01)
*B60W 10/02* (2006.01)
(Continued)

(52) U.S. Cl.
CPC .......... *B60W 20/40* (2013.01); *B60W 10/023* (2013.01); *B60W 10/06* (2013.01);
(Continued)

(58) Field of Classification Search
CPC .... B60W 10/023; B60W 10/02; B60W 20/40; B60W 10/06; B60W 2510/0241;
(Continued)

(56) References Cited

U.S. PATENT DOCUMENTS 4,632,231 A * 12/1986 Hattori ............. B60W 30/1819
477/177
8,187,144 B2 * 5/2012 Kadota ................. B60W 30/20
477/181

(Continued)

FOREIGN PATENT DOCUMENTS

| JP | 2006-336806 A | 12/2006 |
| JP | 2014-136518 A | 7/2014 |
| JP | 2020-093731 A | 6/2020 |

OTHER PUBLICATIONS

KR20080036333A with english translation; Nov. 18, 2024 (Year: 2024).*

*Primary Examiner* — Roger L Pang
(74) *Attorney, Agent, or Firm* — Dinsmore & Shohl LLP

(57) ABSTRACT

The control device of the vehicle performs slip control for engaging the connection and disconnection clutch as an instruction hydraulic pressure for engaging the connection and disconnection clutch by the hydraulic control mechanism after the internal combustion engine is started by the starter, as an instruction hydraulic pressure for maintaining the speed of the internal combustion engine at a higher speed than a lower limit speed for avoiding the stop of the internal combustion engine. Further, the control device of the vehicle performs engagement completion control of raising an instruction hydraulic pressure for engaging the connection and disconnection clutch from an instruction hydraulic pressure in the slip control to an instruction hydraulic pressure for completing engagement of the connection and disconnection clutch when a difference between the speed of the internal combustion engine and the speed of the electric motor becomes smaller than a preset threshold value.

7 Claims, 5 Drawing Sheets

(51) Int. Cl.
*B60W 10/06* (2006.01)
*B60W 30/188* (2012.01)

(52) U.S. Cl.
CPC .............. *B60W 30/1884* (2013.01); *B60W 2510/0241* (2013.01); *B60W 2510/0638* (2013.01); *B60W 2510/0657* (2013.01); *B60W 2510/081* (2013.01); *B60W 2710/023* (2013.01); *B60W 2710/025* (2013.01)

(58) Field of Classification Search
CPC ............. B60W 2510/0638; B60W 2510/0657; B60W 2510/081; B60W 2710/023; B60W 2710/025; B60W 30/192; B60W 30/1884
USPC ................................................. 701/67; 477/5
See application file for complete search history.

(56) References Cited

U.S. PATENT DOCUMENTS

| | | | | |
|---|---|---|---|---|
| 11,788,618 | B2* | 10/2023 | Tan | F16D 48/02 |
| | | | | 475/123 |
| 2006/0272919 | A1 | 12/2006 | Kawamoto et al. | |
| 2009/0156355 | A1* | 6/2009 | Oh | B60W 30/186 |
| | | | | 903/946 |
| 2013/0296109 | A1* | 11/2013 | Nedorezov | B60W 10/08 |
| | | | | 477/5 |
| 2021/0016774 | A1* | 1/2021 | Cho | B60W 10/08 |

\* cited by examiner

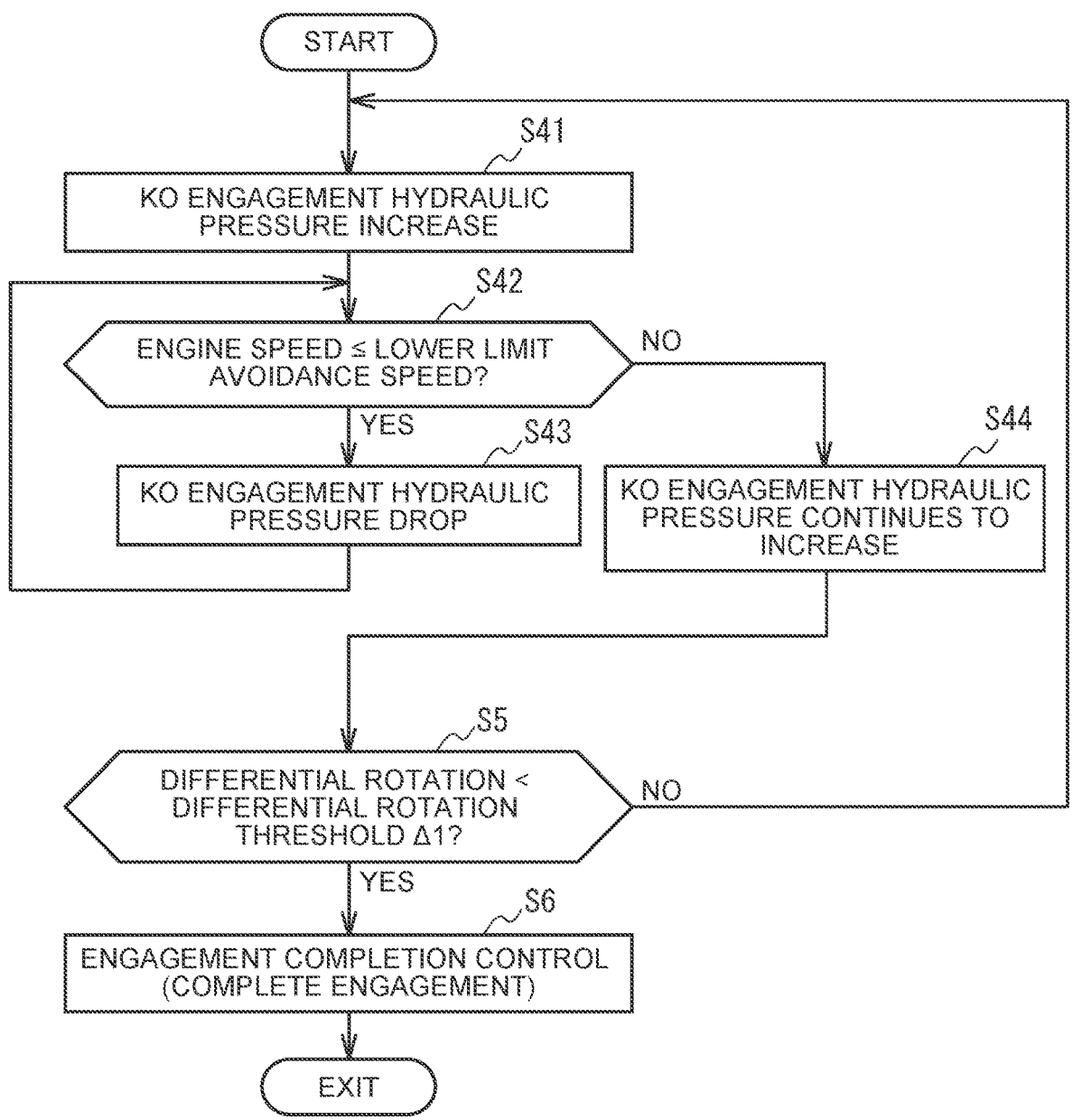

CONTROL DEVICE FOR VEHICLE

CROSS-REFERENCE TO RELATED APPLICATION

This application claims priority to Japanese Patent Application No. 2022-028146 filed on Feb. 25, 2022, incorporated herein by reference in its entirety.

BACKGROUND

1. Technical Field

The present disclosure relates to a control device for a vehicle.

2. Description of Related Art

Conventionally, there has been known a vehicle that is provided with an internal combustion engine and an electric motor serving as a power source on a power transmission path, and is equipped with a connection and disconnection clutch that connects and disconnects transmission of torque between the internal combustion engine and the electric motor (see, for example, Japanese Unexamined Patent Application Publication No. 2020-093731 (JP 2020-093731 A)).

In such a vehicle, when power of the internal combustion engine is transmitted to drive wheels, the connection and disconnection clutch is brought into an engaged state. As a result, the power of the internal combustion engine is transmitted to the drive wheels via an output shaft of the electric motor. That is, in order for the vehicle to be able to travel by driving force of the internal combustion engine, it is necessary to bring the connection and disconnection clutch into the engaged state even when the electric motor is not in operation.

JP 2020-093731 A discloses a control device for a vehicle that enables the vehicle to travel in a situation where the electric motor cannot be driven. The control device for the vehicle starts the internal combustion engine by a starter and gradually engages the connection and disconnection clutch. The connection and disconnection clutch gradually increases a speed of the electric motor, so that the speed of the electric motor and a speed of the internal combustion engine coincide with each other. As a result, the driving force of the internal combustion engine can be transmitted to the drive wheels even in a situation where the electric motor cannot be driven, and the vehicle can travel. In JP 2020-093731 A, rotational torque of the engine is increased together with engagement control of the connection and disconnection clutch.

SUMMARY

In the power transmission path, a rotating element such as a transmission is disposed on the downstream side of the electric motor in a power transmission direction. Therefore, in a case where the rotation of the internal combustion engine is transmitted to the electric motor in a stopped state via the connection and disconnection clutch, it is assumed that drag torque and rotation inertia of the rotating element on the downstream side of the electric motor affect the rotation state of the internal combustion engine. Therefore, depending on a manner in which the connection and disconnection clutch is engaged, the speed of the internal combustion engine may suddenly decrease, and the internal combustion engine may stop. Here, a situation of the vehicle varies, and the state of the hydraulic oil in each part at the start of the internal combustion engine is not the same. For example, in a vehicle left in a very cold region overnight, it is assumed that the working oil is removed from an oil passage for operating the connection and disconnection clutch, and the viscosity of the working oil is increased. In JP 2020-093731 A, the rotational torque of the internal combustion engine is increased together with the engagement control of the connection and disconnection clutch. However, depending on the situation of the vehicle, even when the rotational torque of the internal combustion engine is increased, the speed of the internal combustion engine may decrease, and the internal combustion engine may stop.

Therefore, an object of the control device for the vehicle disclosed in the present specification is to avoid a situation in which the internal combustion engine stops when the connection and disconnection clutch is brought into the engaged state in a situation where the electric motor cannot be driven.

In a control device for a vehicle according to a first aspect of the present disclosure, the vehicle includes an internal combustion engine; an electric motor connected to a power transmission path between the internal combustion engine and a drive wheel so as to be able to transmit power; a connection and disconnection clutch that is provided in the power transmission path and disconnects connection between the internal combustion engine and the electric motor by being in a released state; a starter for starting the internal combustion engine; and a hydraulic control mechanism for controlling a hydraulic pressure supplied to the connection and disconnection clutch.

Here, the control device for the vehicle is configured to perform slip control in which the connection and disconnection clutch is engaged by supplying an instruction hydraulic pressure for engaging the connection and disconnection clutch by the hydraulic control mechanism as an instruction hydraulic pressure for maintaining a speed of the internal combustion engine to a speed higher than a lower limit speed for avoiding stop of the internal combustion engine, after the internal combustion engine is started by the starter.

Further, the control device for the vehicle is configured to perform engagement completion control in which the instruction hydraulic pressure for engaging the connection and disconnection clutch by the hydraulic control mechanism is increased from the instruction hydraulic pressure in the slip control to an instruction hydraulic pressure in which engagement of the connection and disconnection clutch is completed when a difference between the speed of the internal combustion engine and a speed of the electric motor becomes smaller than a preset threshold value.

In the control device for the vehicle according to the first aspect, the control device may be configured to further perform, prior to the slip control, preparation control for increasing the hydraulic pressure in the hydraulic control mechanism for engaging the connection and disconnection clutch from a hydraulic pressure before the starter is driven, after the internal combustion engine is started by the starter.

In the control device for the vehicle according to the first aspect, the instruction hydraulic pressure in the preparation control may be an instruction hydraulic pressure equal to or higher than the instruction hydraulic pressure at a start point of the slip control.

In the control device for the vehicle according to the first aspect, an end of a period in which the preparation control is performed may be a period in which at least one of a decrease in the speed of the internal combustion engine and an increase in the speed of the electric motor is detected.

In the control device for the vehicle according to the first aspect, the instruction hydraulic pressure in the slip control may be given by a pulse wave in which the instruction hydraulic pressure repeatedly increases and decreases.

In the control device for the vehicle according to the first aspect, the control device may be configured such that, in the slip control, when the speed of the internal combustion engine becomes equal to or lower than a lower limit avoidance speed set to a value higher than the lower limit speed, the instruction hydraulic pressure for engaging the connection and disconnection clutch is reduced from an instruction hydraulic pressure when the speed equal to or lower than the lower limit avoidance speed is indicated.

In the control device for the vehicle according to the first aspect, the instruction hydraulic pressure in the engagement completion control may be set in accordance with rotational torque of the internal combustion engine.

According to the present disclosure, it is possible to avoid a situation in which the internal combustion engine stops when the connection and disconnection clutch is brought into the engaged state in a situation where the electric motor cannot be driven.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flow chart illustrating another exemplary K0 clutch engagement control.

DETAILED DESCRIPTION OF EMBODIMENTS

Figure 1:
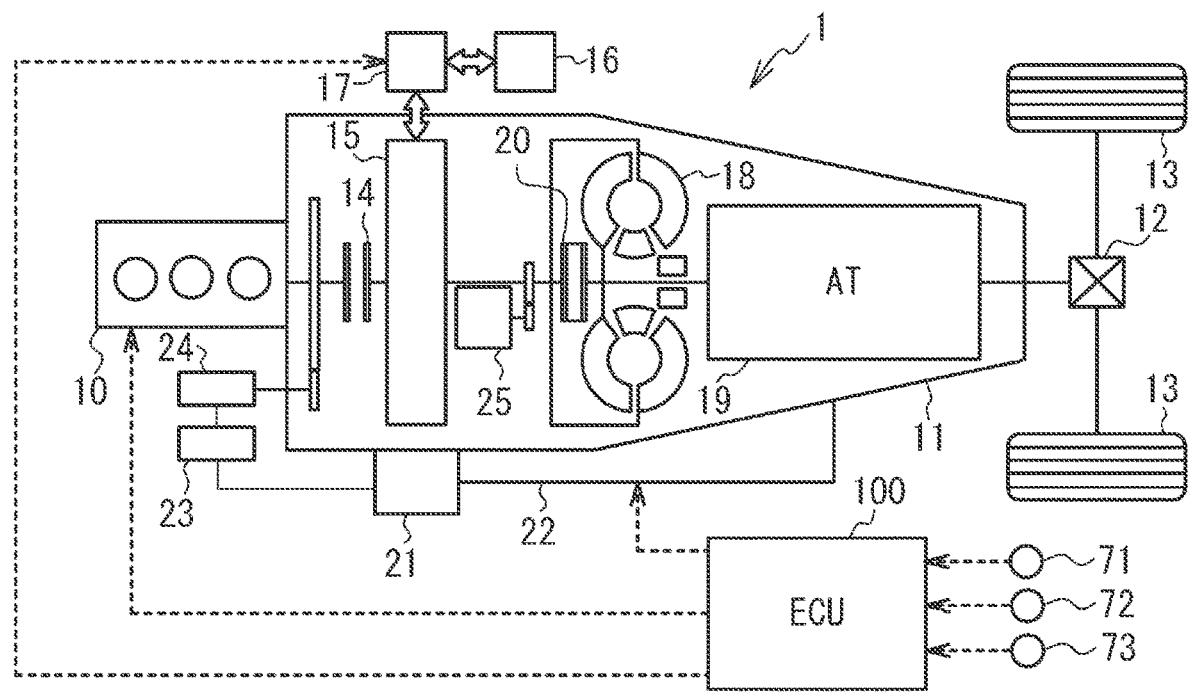
FIG. 1 is a schematic configuration diagram of a hybrid electric vehicle including a control device for a vehicle according to an embodiment.

Hereinafter, embodiments of the present disclosure will be described with reference to the accompanying drawings. However, in the drawings, the dimensions, ratios, and the like of the respective parts may not be shown so as to completely coincide with the actual ones. Further, in some drawings, details are omitted. Further, the scale of each element depicted between the figures may be different.

Outline of the Hybrid Electric Vehicle

FIG. 1 is a schematic configuration diagram of a hybrid electric vehicle 1. In the hybrid electric vehicle 1, a K0 clutch 14, a motor generator 15, a torque converter 18, and a transmission 19 are provided in this order in a power transmission path from an engine 10 corresponding to an internal combustion engine to the drive wheels 13. The engine 10 and the motor generator 15 are mounted on the hybrid electric vehicle 1 as driving sources for traveling. The engine 10 is an example of an internal combustion engine, for example, a series three-cylinder gasoline engine, but the number of cylinders and the arrangement method of cylinders are not limited thereto. In addition, the internal combustion engine may be a diesel engine using light oil as a fuel. K0 clutch 14, the motor generator 15, the torque converter 18, and the transmission 19 are provided in the transmission unit 11. The transmission unit 11 and the left and right drive wheels 13 are drivingly connected to each other via a differential 12.

K0 clutch 14 is provided between the motor generator 15 and the engine 10 on the power transmission path. K0 clutch 14 is supplied with hydraulic pressure, and is brought into an engaged state from a released state. K0 clutch 14 is engaged to connect the power transmission between the engine 10 and the motor generator 15. When the hydraulic pressure is stopped, K0 clutch 14 is released to shut off power transmission between the engine 10 and the motor generator 15. The engagement state is a state in which both engagement elements of K0 clutch 14 are coupled to each other and the engine 10 and the motor generator 15 have the same speed. The disengaged state is a state in which both engagement elements of K0 clutches 14 are separated from each other. Depending on the state in which the engagement hydraulic pressure is supplied, K0 clutch 14 may be in a slip state in which the speed of the engine 10 side does not coincide with the speed of the motor generator 15 side. K0 clutch 14 corresponds to a disconnection clutch.

The motor generator 15 is connected to the battery 16 via an inverter 17. The motor generator 15 functions as a motor that generates a driving force of the vehicle in response to power supply from the battery 16. The motor generator 15 also functions as a generator that generates electric power to charge the battery 16 in response to power transmission from the engine 10 and the drive wheels 13. The electric power exchanged between the motor generator 15 and the battery 16 is adjusted by the inverter 17. The use of the battery 16 may be limited depending on the temperature, such as at a cryogenic temperature. The temperature at which the use is restricted is set for each specification of the actual machine. The motor generator 15 corresponds to an electric motor.

The inverter 17 is controlled by an ECU 100 to be described later, and converts a DC voltage from the battery 16 into an AC voltage. The inverter 17 converts the AC voltage from the motor generator 15 into a DC voltage. In the case of the power running operation in which the motor generator 15 outputs torque, the inverter 17 converts the DC voltage of the battery 16 into an AC voltage and adjusts the power supplied to the motor generator 15. In the case of the regenerative operation generated by the motor generator 15, the inverter 17 converts the AC voltage from the motor generator 15 into a DC voltage and adjusts the electric power supplied to the battery 16. The battery 16 is mainly used as a power source for traveling of the hybrid electric vehicle 1.

The torque converter 18 is a fluid coupling having a torque amplification function. The transmission 19 is a stepped automatic transmission in which the gear ratio is switched in multiple stages by switching the gear stages, but the present disclosure is not limited thereto, and may be a continuously-type automatic transmission. The transmission 19 is provided between the motor generator 15 and the drive wheels 13 on the power transmission path. The motor generator 15 and the transmission 19 are coupled to each other via the torque converter 18. The torque converter 18 is provided with a lock-up clutch 20 that receives a supply of hydraulic pressure and is in an engaged state to directly couple the motor generator 15 and the transmission 19.

The transmission unit 11 is further provided with an electric oil pump 21 and a hydraulic control mechanism 22.

Hydraulic pressure generated by the electric oil pump 21 is supplied to K0 clutch 14, the torque converter 18, the transmission 19, and the lockup clutch 20 via the hydraulic control mechanism 22. The hydraulic control mechanism 22 is provided with hydraulic circuits of K0 clutch 14, the torque converter 18, the transmission 19, and the lockup clutch 20, and various hydraulic control valves for controlling the hydraulic pressures. A wet clutch may be provided instead of the torque converter 18.

The hybrid electric vehicle 1 includes an auxiliary battery 23 separately from the battery 16. The hybrid electric vehicle 1 includes a starter 24 for starting the engine 10. The starter 24 is driven by an auxiliary battery 23. The battery 16 may be limited in use, for example, when the temperature of the environment in which the vehicle is placed is very low, but the auxiliary battery 23 can be used even in such a case. The engine 10 can be started by a starter 24 driven by an auxiliary battery 23. The auxiliary battery 23 can also be used for driving the electric oil pump 21.

The hybrid electric vehicle 1 includes a mechanical oil pump 25. The mechanical oil pump 25 operates when the output shaft of the motor generator 15 rotates. Therefore, the mechanical oil pump 25 is not driven when the engine 10 or the motor generator 15 is stopped. The mechanical oil pump 25 is not driven when the motor generator 15 is stopped and K0 clutch 14 is released even when the engine 10 is in operation. Like the electric oil pump 21, the mechanical oil pump 25 can supply the hydraulic pressure to K0 clutch 14, the torque converter 18, the transmission 19, and the lock-up clutch 20 via the hydraulic control mechanism 22.

The hybrid electric vehicle 1 is provided with an Electronic Control Unit (ECU) 100 as a control device of the vehicle. ECU 100 is an electronic control unit including an arithmetic processing unit that performs various arithmetic processing related to travel control of vehicles, and a memory that stores control programs and data.

ECU 100 controls driving of the engine 10 and the motor generator 15. Specifically, ECU 100 controls the torque and the speed of the engine 10 by controlling the throttle opening degree, the ignition timing, and the fuel injection quantity of the engine 10. ECU 100 controls the torque and the speed of the motor generator 15 by controlling the inverters 17 to adjust the amount of transfer of electric power between the motor generator 15 and the battery 16. ECU 100 controls driving of K0 clutch 14, the lock-up clutch 20, and the transmission 19 through control of the hydraulic control mechanism 22.

Signals from the ignition switch 71, the crank angle sensor 72, and the motor sensor 73 are inputted to ECU 100. The crank angle sensor 72 detects the speed of the crankshaft of the engine 10. The motor rotation speed sensor 73 detects the rotation speed of the output shaft of the motor generator 15. ECU 100 issues a drive command to the starter 24 when the ignition switch 71 is turned on.

ECU 100 causes the hybrid electric vehicles to travel in either the motor mode or the hybrid mode. In the motor mode, ECU 100 releases K0 clutch 14 and travels by the power of the motor generator 15. At this time, the engine 10 may be in a stopped state. In the hybrid mode, ECU 100 switches K0 clutch 14 into engagement and runs at least with the power of the engine 10. For example, when the hybrid electric vehicle 1 is placed in a cryogenic environment and the use of the battery 16 is restricted, K0 clutch 14 is also brought into an engaged state when the hybrid electric vehicle 1 is allowed to travel only by the driving force of the engine 10.

K0 Clutch Engagement Control

Figure 2:
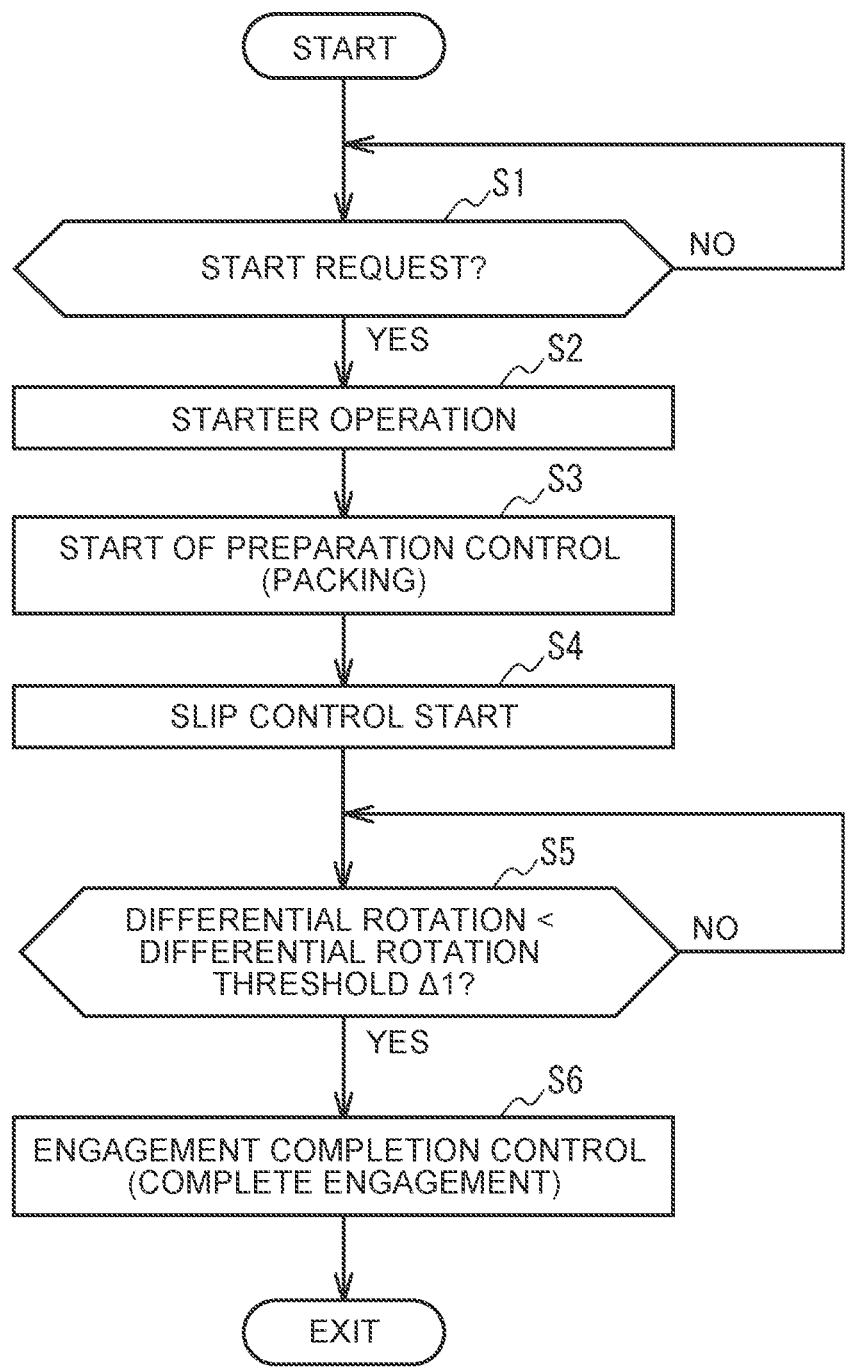
FIG. 2 is a flow chart illustrating an exemplary K0 clutch-engagement control executed by the control device (ECU) for the vehicle according to the embodiment.
Figure 3:
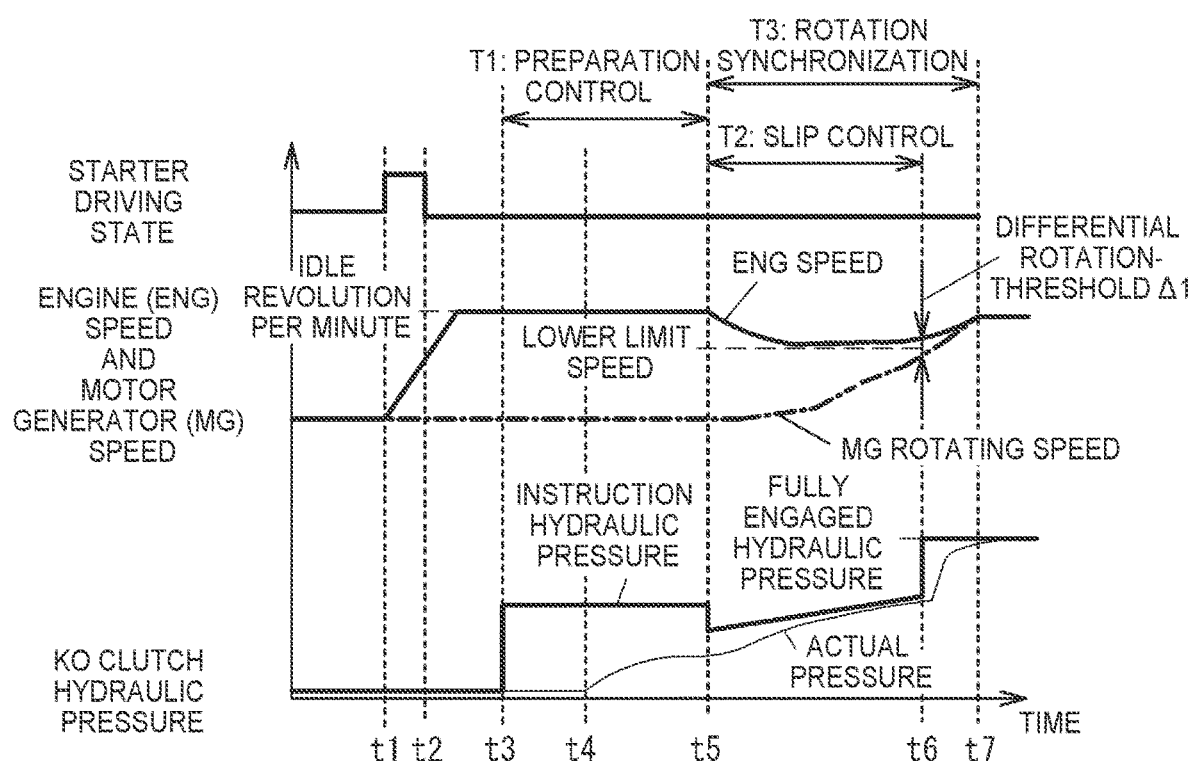
FIG. 3 is a time chart showing the transition of K0 clutch engagement control performed by the control device (ECU) of the embodiment.

Next, with reference to FIGS. 2 and 3, the control will be described in the case where both the engine 10 and the motor generator 15 are stopped, the hybrid electric vehicle 1 is shifted to the travelable state. Here, it is assumed that a predetermined time has elapsed after the hybrid electric vehicle 1 stops in a state where both the engine 10 and the motor generator 15 are stopped. It is assumed that the hybrid electric vehicle 1 is in a state in which the hydraulic pressure is removed at a position where the supply of the hydraulic pressure is required after a predetermined time has elapsed after the stop. The environment in which the hybrid electric vehicle 1 is placed is a cryogenic environment in which the use of the battery 16 is restricted. In this case, since the hybrid electric vehicle 1 cannot operate the motor generator 15, the engine 10 is started in order to set the hybrid electric vehicle 1 in a travelable state. Since the motor generator 15 cannot be used to start the engine 10, the engine 10 is started using the starter 24 driven by the auxiliary battery 23. When the hybrid electric vehicle 1 is in the stopped state, since K0 clutch 14 is in the released state, K0 clutch engagement control is performed in order to make the hybrid electric vehicle 1 in the travelable state. Hereinafter, K0 clutch-engagement control will be described in detail. Referring to FIG. 3, K0 clutch-engagement control includes a preparation control performed in a period T1 and a slip control performed in a period T2. Further, K0 clutch engagement control includes engagement completion control (see the step S6 in FIG. 2) performed at the time t6 which is the end of the period T2.

ECU 100 determines whether or not there is a startup request for the engine 10 in the step S1. Specifically, ECU 100 determines whether or not the ignition switch 71 is turned on. ECU 100 repeats the process of step S1 when a negative determination (No) is made in step S1 until an affirmative determination (Yes determination) is made in step S1. When an affirmative determination is made in step S1, ECU 100 proceeds to step S2.

ECU 100 issues a drive command to the starter 24 in step S2. Thus, the starter 24 is driven from the time t1 to the time t2, the speed of the engine 10 is increased, and the start of the engine 10 is completed. The number of revolutions of the engine 10 after starting is maintained at a preset idle number of revolutions.

ECU 100 drives the starter 24 in the step S2 to start the engine 10, and then performs the preparation control to engage K0 clutch 14 in the step S3. This preparation control is a control for raising the hydraulic pressure in the hydraulic control mechanism 22 that engages K0 clutch 14 prior to the slip control described in detail later, and is sometimes referred to as packing. By performing the preparation control, the hydraulic pressure in the oil passage for supplying the hydraulic pressure to K0 clutch 14 is increased, and K0 clutch 14 can immediately shift to the engaged condition. In the present embodiment, the preparation control is performed in the period T1 from the time t3 to the time t5. The end of the period T1, that is, the time t5, may be a time when at least one of a decrease in the speed of the engine 10 or an increase in the speed of the motor generator 15 is detected. The reason why the speed of the engine 10 decreases or the speed of the motor generator 15 increases is that it can be determined that K0 clutch 14 can be engaged. In the present embodiment, the time point at which the decrease in the speed of the engine 10 is detected is set as the time t5.

In the present embodiment, the length of the period T1 and the instruction hydraulic pressure are set in advance according to the hardware configuration of the hybrid electric vehicle 1, such as the engine 10, K0 clutch 14, and the hydraulic control mechanism 22, and the starting target period. This makes it possible to appropriately raise the state of the hydraulic pressure in accordance with the configuration of the hybrid electric vehicle 1. When ECU 100 starts the preparation control from the time t3, the actual pressure of the hydraulic pressure for engaging K0 clutch starts to gradually increase from the time t4 after a delay from the time t3.

ECU 100 proceeds to the step S4 when the preparation control performed in the step S3 is completed. ECU 100 initiates slip control in step S4. The slip control is performed in the period T2 from the time t5 to the time t6. During the time t5, the speed of the engine 10 is maintained at the idle speed. On the other hand, the motor generator 15 is not in operation, and its speed is 0 (zero). In the slip control, K0 clutches 14 are gradually engaged so that the speeds of the motor generator 15 and the engine 10 in which the differential rotation is occurring coincide with each other. During this time, the rotational element of K0 clutch 14 on the engine-10 side and the rotational element of the motor-generator 15 side are slipped. As a result, the speed of the motor generator 15 gradually increases, while the speed of the engine 10 decreases as the speed of the motor generator 15 increases. At this time, the number of revolutions of the engine 10 is controlled so as to maintain a higher number of revolutions than the lower limit speed for avoiding the stop of the engine 10. Specifically, the instruction hydraulic pressure for engaging K0 clutch 14 is controlled so as to maintain the speed of the engine 10 at a higher speed than the lower limit speed. The higher the engagement hydraulic pressure of K0 clutch 14, the faster the speed of the motor generator 15 can be increased. However, on the other hand, a drop in the speed of the engine 10 tends to be rapid. When the speed of the engine 10 drops sharply and falls below the lower limit speed, there is a possibility that the engine 10 is stopped in a so-called engine stall state. Therefore, in the present embodiment, the instruction hydraulic pressure is set so that the speed of the engine 10 does not fall below the lower limit speed during the slip control. As a result, the engine 10 is prevented from being stopped. The lower limit speed is set in accordance with the specifications of the engine 10, such as the idle speed.

In the period T2, the instruction hydraulic pressure is gradually increasing. The ascending speed is set so that the speed of the engine 10 does not reach the lower limit speed under the influence of the drag torque and the rotational inertia of the rotating elements after the motor generator 15.

Here, the instruction hydraulic pressure during the slip control will be described in more detail. Referring to FIG. 3, during the time t5 from which the slip control is performed to the time t6 (period T2), the instruction hydraulic pressure gradually increases. The time t5 is a starting point of the slip control. That is, the time t5 is a timing at which the control is switched from the preparation control to the slip control. The instruction hydraulic pressure is temporarily lowered from the instruction hydraulic pressure during the preparation control so far in the time t5. In other words, the instruction hydraulic pressure in the preparation control is an instruction hydraulic pressure equal to or higher than the instruction hydraulic pressure at the start point of the slip control. That is, the instruction hydraulic pressure in the preparation control is the same as or higher than the instruction hydraulic pressure at the start of the slip control. With such an instruction hydraulic pressure, it is possible to shorten the period T1 required for the preparation control, and as a whole, it is possible to shorten the period for enabling the hybrid electric vehicle 1 to travel.

Figure 4:
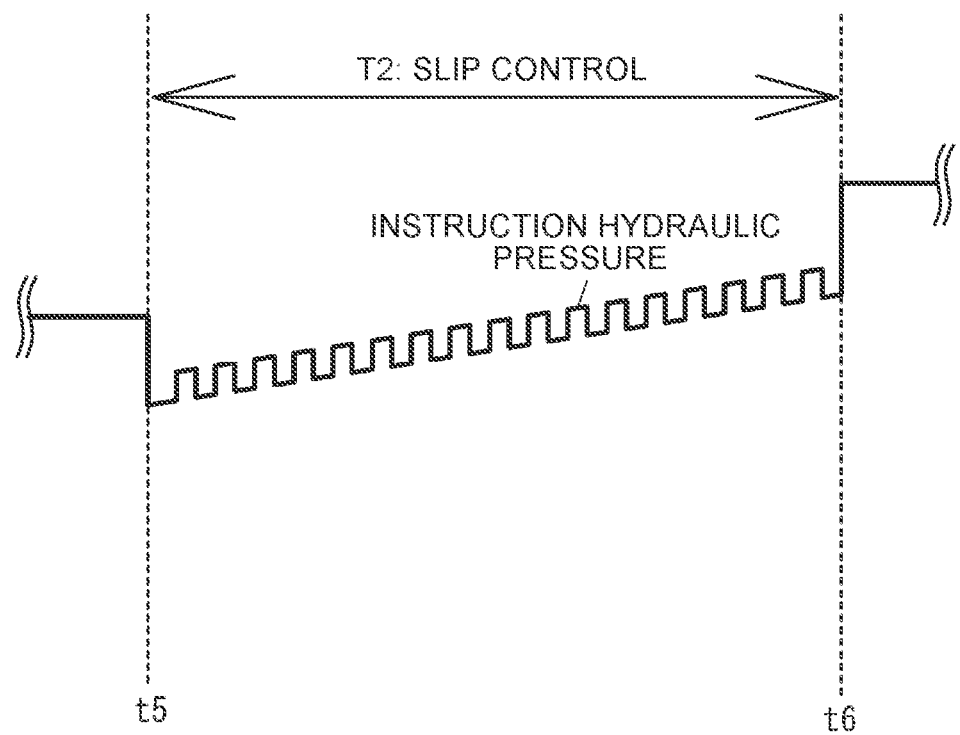
FIG. 4 is an explanatory diagram illustrating an exemplary instruction pressure of the engagement hydraulic pressure of K0 clutch in the slip control included in K0 clutch engagement control.

Here, with reference to FIG. 4, the instruction hydraulic pressure during the slip control will be described. The instruction hydraulic pressure during the slip control may be a pulse wave as shown in FIG. 4. In this way, the engine 10 can be easily prevented from being stopped by using a pulse wave in which the increase and the decrease of the instruction hydraulic pressure are repeated. The speed of the engine 10 is likely to decrease when the hydraulic pressure for engaging K0 clutch 14 is suddenly increased. Therefore, the change in the number of revolutions can be made gentle by setting the instruction hydraulic pressure as a pulse wave and providing a timing for lowering the instruction hydraulic pressure. Although the pulse wave shown in FIG. 4 is rectangular, the waveform of the pulse wave is not limited to this, and may be other waveforms such as a square wave or a sine wave. Further, a continuous waveform other than the pulse wave or a fine stepped waveform may be used, and the waveform of the instruction hydraulic pressure during the slip control may be appropriately selected without being limited to a specific waveform.

ECU 100 proceeds to step S5 after starting the slip control in step S4. In the step S5, ECU 100 determines whether the difference rotation is smaller than a preset difference rotation threshold Δ1. The differential rotation is a difference between the speed of the engine 10 and the speed of the motor generator 15. The speed of the engine 10 is acquired by the crank angle sensor 72. The speed of the motor generator 15 is acquired by the motor speed sensor 73. The differential rotational thresholds Δ1 are set in advance in view of the magnitude of shocks generated when K0 clutch 14 is engaged so that the speed of the engine 10 and the speed of the motor generator 15 coincide with each other, and the performance and properties of the engine 10.

When a negative determination is made in step S5, ECU 100 repeats the process of step S5 until an affirmative determination is made in step S5. When an affirmative determination is made in step S5, ECU 100 proceeds to step S6.

ECU 100 performs engagement completion control in S6 of steps. The engagement completion control is a control for raising the instruction hydraulic pressure for engaging K0 clutch 14 by the hydraulic control mechanism 22 to the instruction hydraulic pressure at which the engagement of K0 clutch 14 is completed. The engagement completion means that the speeds of the engine 10 and the motor generator 15 coincide with each other, and the rotational element of K0 clutch 14 on the engine 10 side and the rotational element of the motor generator 15 side do not slip and are synchronized with each other. In the present embodiment, the slipping control is ended at the time t6, and the engagement completion control is performed. In the engagement completion control, the instruction hydraulic pressure rises to the fully engaged hydraulic pressure. Accordingly, the speed of the engine 10 and the speed of the motor generator 15 coincide with each other in the time t7. As described above, K0 clutch-engagement control is completed, and the hybrid electric vehicle 1 is ready to travel.

Here, the instruction hydraulic pressure in the engagement completion control is set in accordance with the rotational torque of the engine 10. This suppresses slipping in K0 clutch 14 and allows the engine 10 and the motor generator 15 to be connected to each other.

In the present embodiment, the engagement completion control is performed at the time t6 when the difference rotation is smaller than the difference rotation threshold Δ1. Therefore, in the present embodiment, the period T3 from the time t5 to the time t7 is a rotation synchronization period in which the rotation speed of the engine 10 and the rotation speed of the motor generator 15 are synchronized. On the other hand, the period during which the slip control is performed may be managed in time. That is, the engagement completion control may be performed when a predetermined time set in advance has elapsed from the time t5 at which the slip control is started. In this case, it is also assumed that the speed of the engine 10 and the speed of the motor generator 15 coincide with each other before the engagement completion control is performed. However, by performing the engagement completion control thereafter, the hybrid electric vehicle 1 can be brought into a travelable state.

Effects

According to the present embodiment, since the instruction hydraulic pressure for engaging K0 clutch 14 is set as the instruction hydraulic pressure to be maintained at a speed higher than the lower limit speed of the engine 10, it is possible to avoid stopping the engine 10.

Further, according to the present embodiment, by performing the preparation control prior to the slip control, it is possible to shorten the time required for bringing the hybrid electric vehicle 1 into a travelable state. Further, the period of the preparation control can be shortened by setting the instruction hydraulic pressure in the preparation control to an instruction hydraulic pressure higher than the instruction hydraulic pressure at the start point of the slip control.

Further, since the instruction hydraulic pressure is given by the pulse wave, the internal combustion engine is effectively prevented from being stopped.

Modification

Next, referring to FIG. 5, a modification of a control device (ECU) 100 for vehicles will be described. The flowchart illustrated in FIG. 5 is a flowchart in which the details of the slip control (step S4) in the flowchart illustrated in FIG. 2 are changed. In this variant, feedback control is implemented in the slip control. In the flow chart shown in FIG. 5, the process from step S1 to step S3 in the flow chart shown in FIG. 2 is omitted, but in this modification, the process from step S1 to step S3 is performed in the same manner. Note that, since the time chart itself for the modification is common to the time chart shown in FIG. 3, the time chart shown in FIG. 3 is also referred to as appropriate in the following description.

ECU 100 increases the instruction hydraulic pressure for engaging K0 clutch 14 in step S41 (time t5 in FIG. 3). ECU 100 determines whether or not the speed of the engine 10 is equal to or lower than the lower limit avoidance speed in the step S42 performed following the step S41. Here, the lower limit avoidance speed is a speed higher than the lower limit speed. When the speed of the engine 10 reaches the lower limit speed, the engine 10 is more likely to stop, but by setting the lower limit avoidance speed, it is possible to detect a state before such a state is reached.

When an affirmative determination is made in step S42, ECU 100 proceeds to step S43. ECU 100, in a stepped S43, lowers the instruction hydraulic pressure for engaging K0 clutch 14. As a result, it is possible to prevent the speed of the engine 10 from falling to the lower limit speed, and as a result, it is possible to prevent the engine 10 from stopping. The amount of decrease in the instruction hydraulic pressure can be appropriately set by adaptation or simulation by an actual machine. ECU 100 performs the process of step S43 and then performs the process of step S42 again.

When a negative determination is made in step S42, ECU 100 proceeds to step S44. ECU 100 continues to increase the instruction hydraulic pressure in step S44. ECU 100 proceeds to step S5 after performing the process of step S44. The steps S5 and S6 are similar to the flow chart shown in FIG. 2, and ECU 100 performs engagement completion control at time t6 in the time chart shown in FIG. 3, and ends the series of control.

According to this modification, since the instruction hydraulic pressure for engaging K0 clutch 14 is controlled while comparing the engine speed with the lower limit avoidance speed, it is possible to avoid the engine speed from reaching the lower limit speed. As a result, the engine 10 can be prevented from being stopped.

Although the embodiments of the present disclosure have been described in detail above, the present disclosure is not limited to such specific embodiments, and various modifications and changes can be made within the scope of the gist of the present disclosure described in the claims.

What is claimed is:

1. A control device for a vehicle, the vehicle comprising:
an internal combustion engine;
an electric motor connected to a power transmission path between the internal combustion engine and a drive wheel so as to be able to transmit power;
a connection and disconnection clutch that is provided in the power transmission path and disconnects connection between the internal combustion engine and the electric motor by being in a released state;
a starter for starting the internal combustion engine; and
a hydraulic control mechanism for controlling a hydraulic pressure supplied to the connection and disconnection clutch, wherein the control device of the vehicle is configured to
perform slip control in which the connection and disconnection clutch is engaged by supplying an instruction hydraulic pressure for engaging the connection and disconnection clutch by the hydraulic control mechanism as an instruction hydraulic pressure for maintaining a speed of the internal combustion engine to a speed higher than a lower limit speed for avoiding stop of the internal combustion engine, after the internal combustion engine is started by the starter, and
perform engagement completion control in which the instruction hydraulic pressure for engaging the connection and disconnection clutch by the hydraulic control mechanism is increased from the instruction hydraulic pressure in the slip control to an instruction hydraulic pressure in which engagement of the connection and disconnection clutch is completed when a difference between the speed of the internal combustion engine and a speed of the electric motor becomes smaller than a preset threshold value.

2. The control device for the vehicle according to claim 1, wherein the control device is configured to further perform, prior to the slip control, preparation control for increasing the hydraulic pressure in the hydraulic control mechanism for engaging the connection and disconnection clutch from a hydraulic pressure before the starter is driven, after the internal combustion engine is started by the starter.

3. The control device for the vehicle according to claim 2, wherein the instruction hydraulic pressure in the preparation control is an instruction hydraulic pressure equal to or higher than the instruction hydraulic pressure at a start point of the slip control.

4. The control device for the vehicle according to claim 2, wherein an end of a period in which the preparation control is performed is a period in which at least one of a decrease in the speed of the internal combustion engine and an increase in the speed of the electric motor is detected.

5. The control device for the vehicle according to claim 1, wherein the instruction hydraulic pressure in the slip control is given by a pulse wave in which the instruction hydraulic pressure repeatedly increases and decreases.

6. The control device for the vehicle according to claim 1, wherein the control device is configured such that, in the slip control, when the speed of the internal combustion engine becomes equal to or lower than a lower limit avoidance speed set to a value higher than the lower limit speed, the instruction hydraulic pressure for engaging the connection and disconnection clutch is reduced from an instruction hydraulic pressure when the speed equal to or lower than the lower limit avoidance speed is indicated.

7. The control device for the vehicle according to claim 1, wherein the instruction hydraulic pressure in the engagement completion control is set in accordance with rotational torque of the internal combustion engine.

* * * * *